Figure 1:
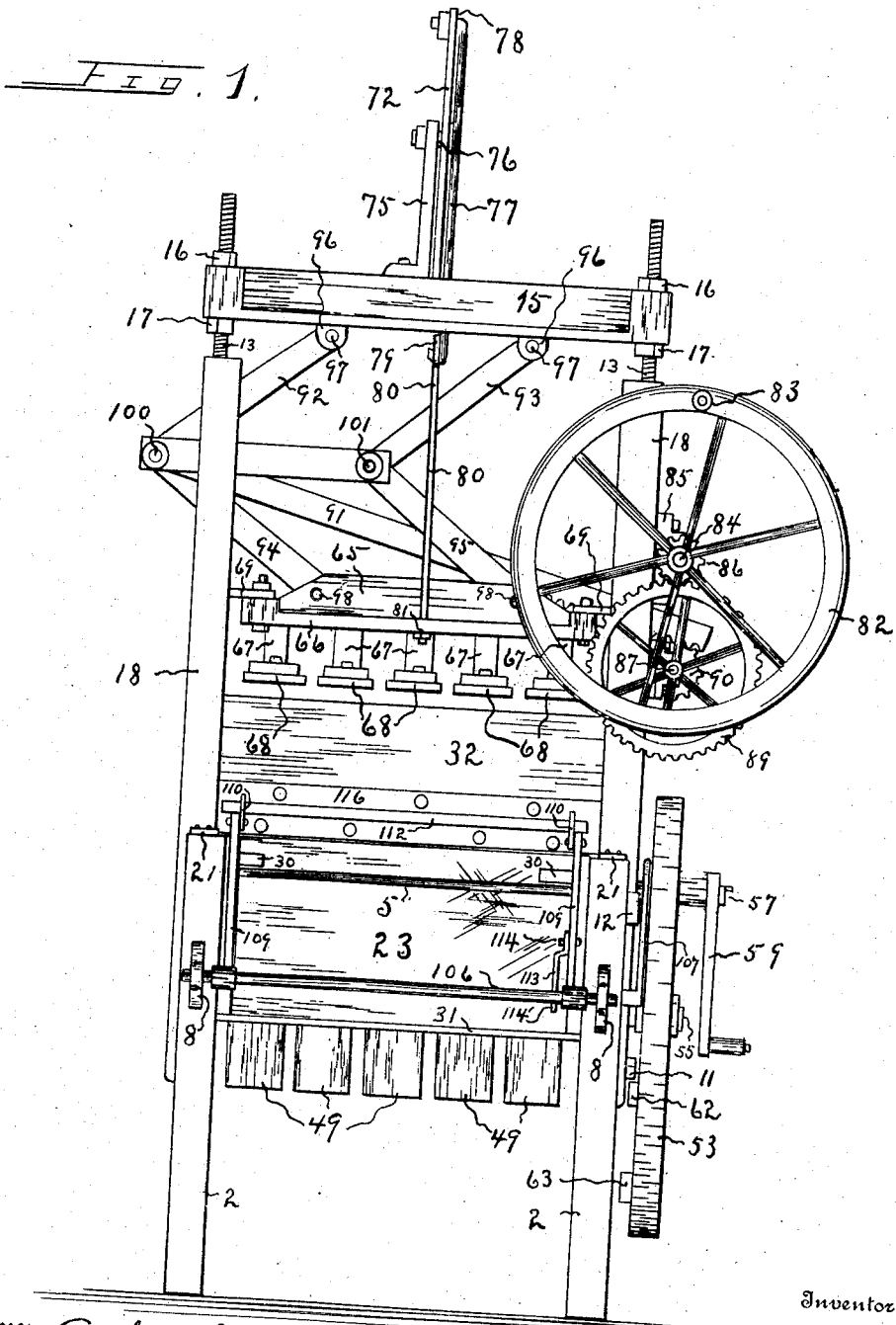

No. 866,175. PATENTED SEPT. 17, 1907.
P. K. YOUNG.
CEMENT BRICK PRESSING MACHINE.
APPLICATION FILED AUG. 21, 1906.

7 SHEETS—SHEET 1.

Witnesses
Arthur Sturges.
Frederic Bacon

Inventor
Philip K. Young,
By Hiram A. Sturges,
Attorney

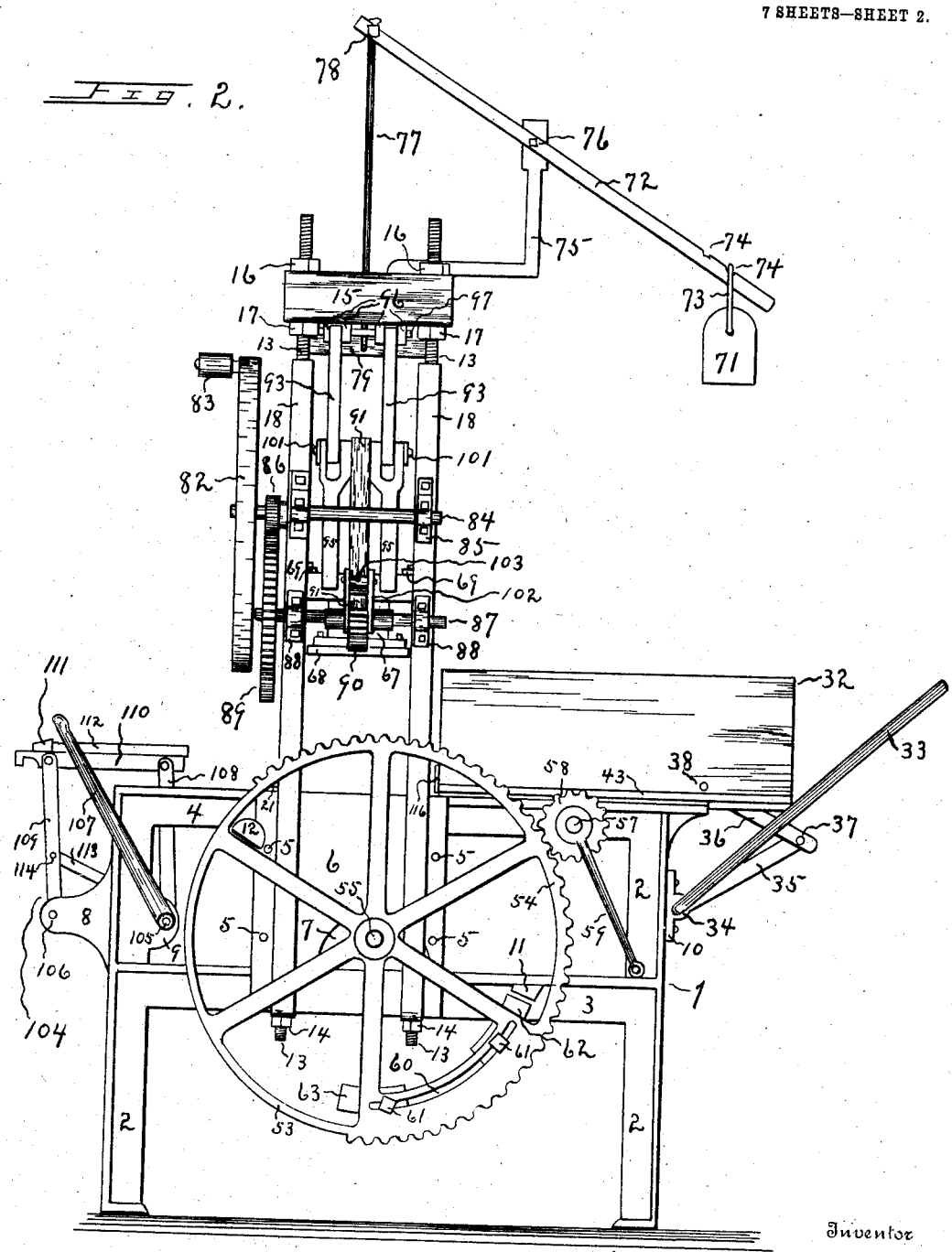

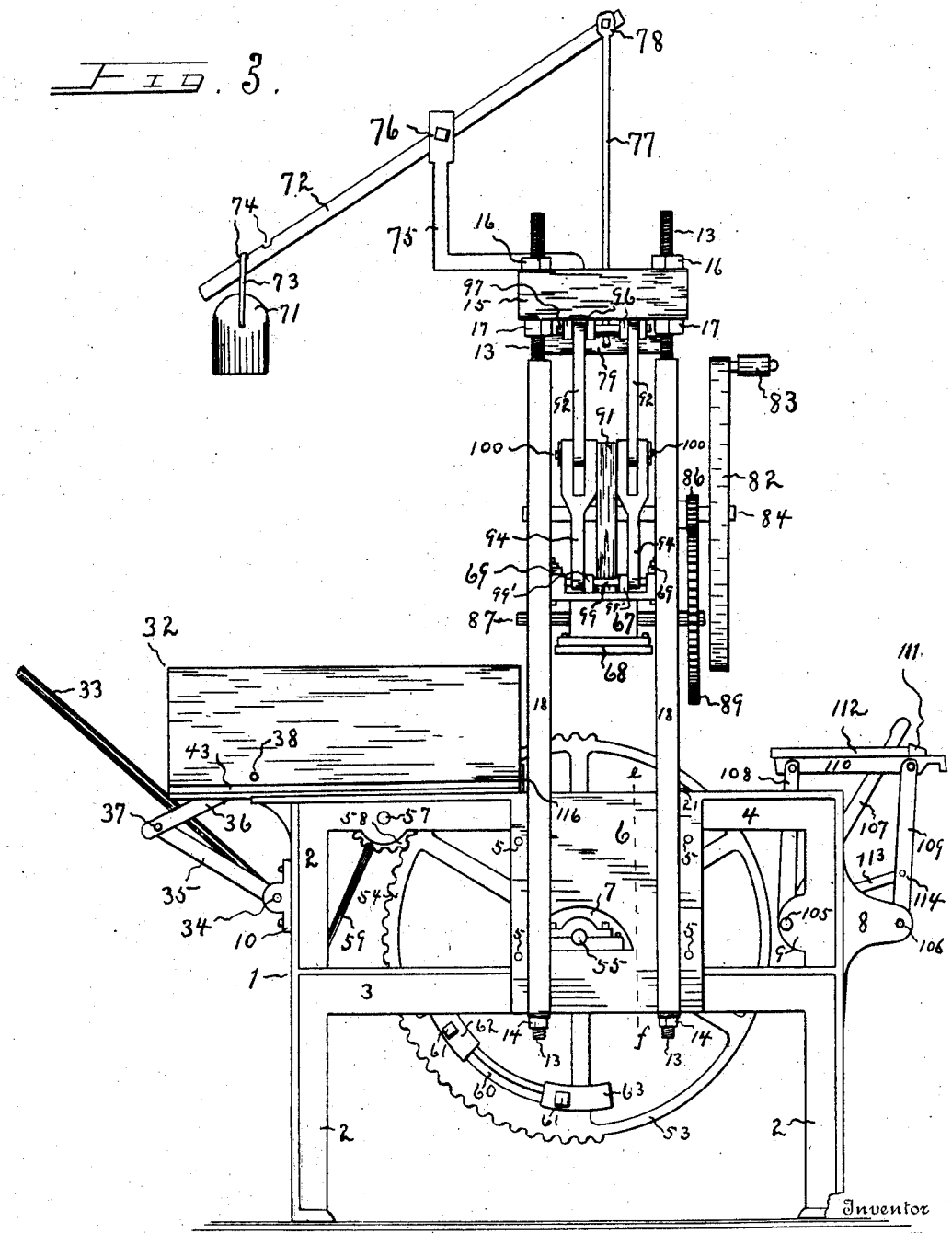

No. 866,175. PATENTED SEPT. 17, 1907.
P. K. YOUNG.
CEMENT BRICK PRESSING MACHINE.
APPLICATION FILED AUG. 21, 1906.
7 SHEETS—SHEET 4.
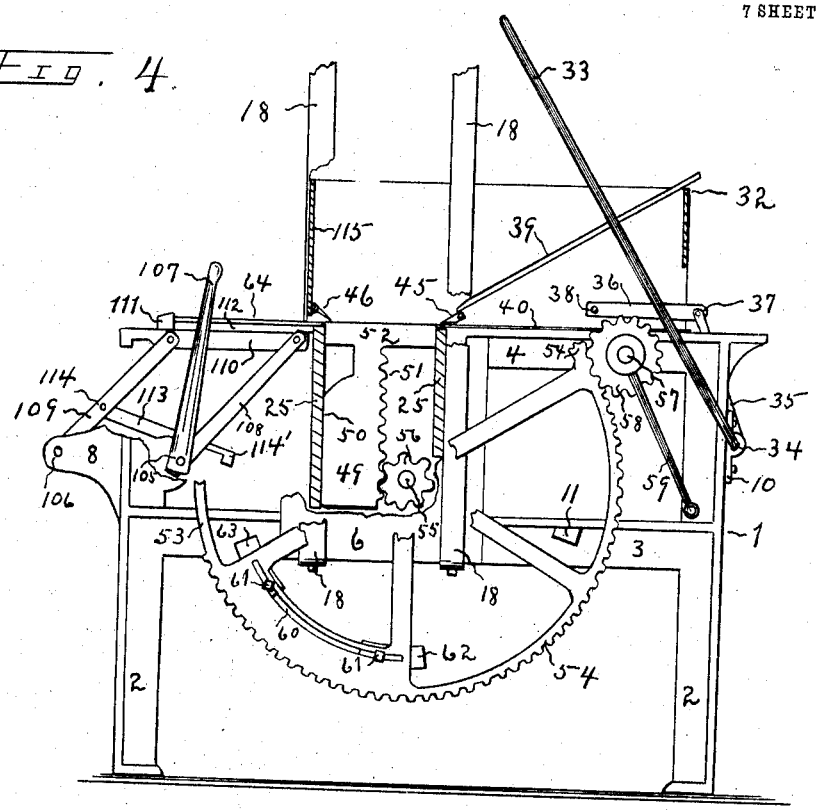
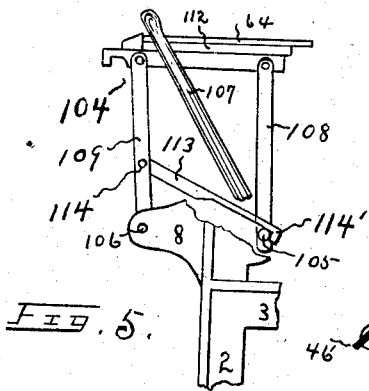

No. 866,175. PATENTED SEPT. 17, 1907.
P. K. YOUNG.
CEMENT BRICK PRESSING MACHINE.
APPLICATION FILED AUG. 21, 1906.
7 SHEETS—SHEET 5.
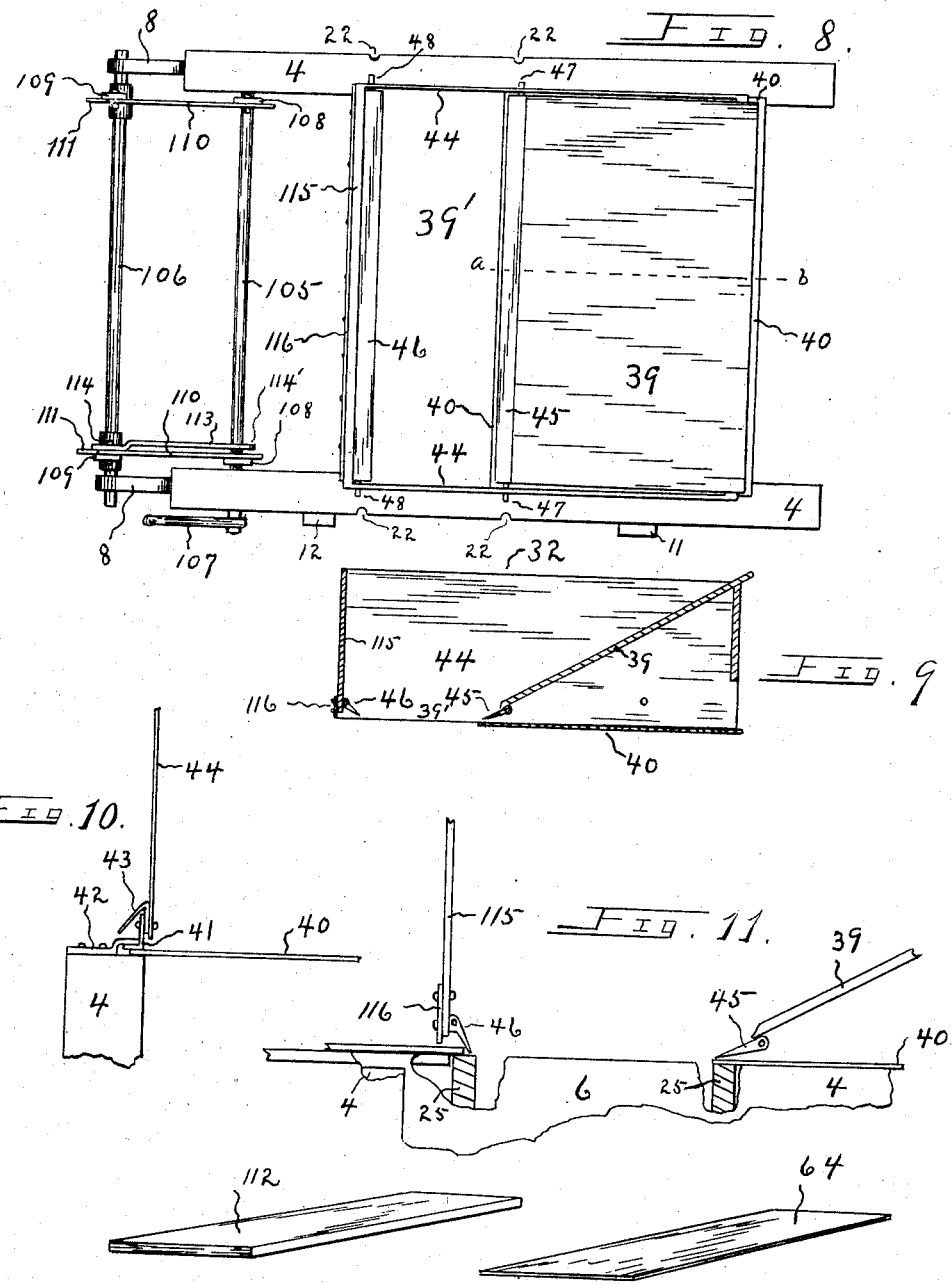

No. 866,175. PATENTED SEPT. 17, 1907.
P. K. YOUNG.
CEMENT BRICK PRESSING MACHINE.
APPLICATION FILED AUG. 21, 1906.
7 SHEETS—SHEET 6.
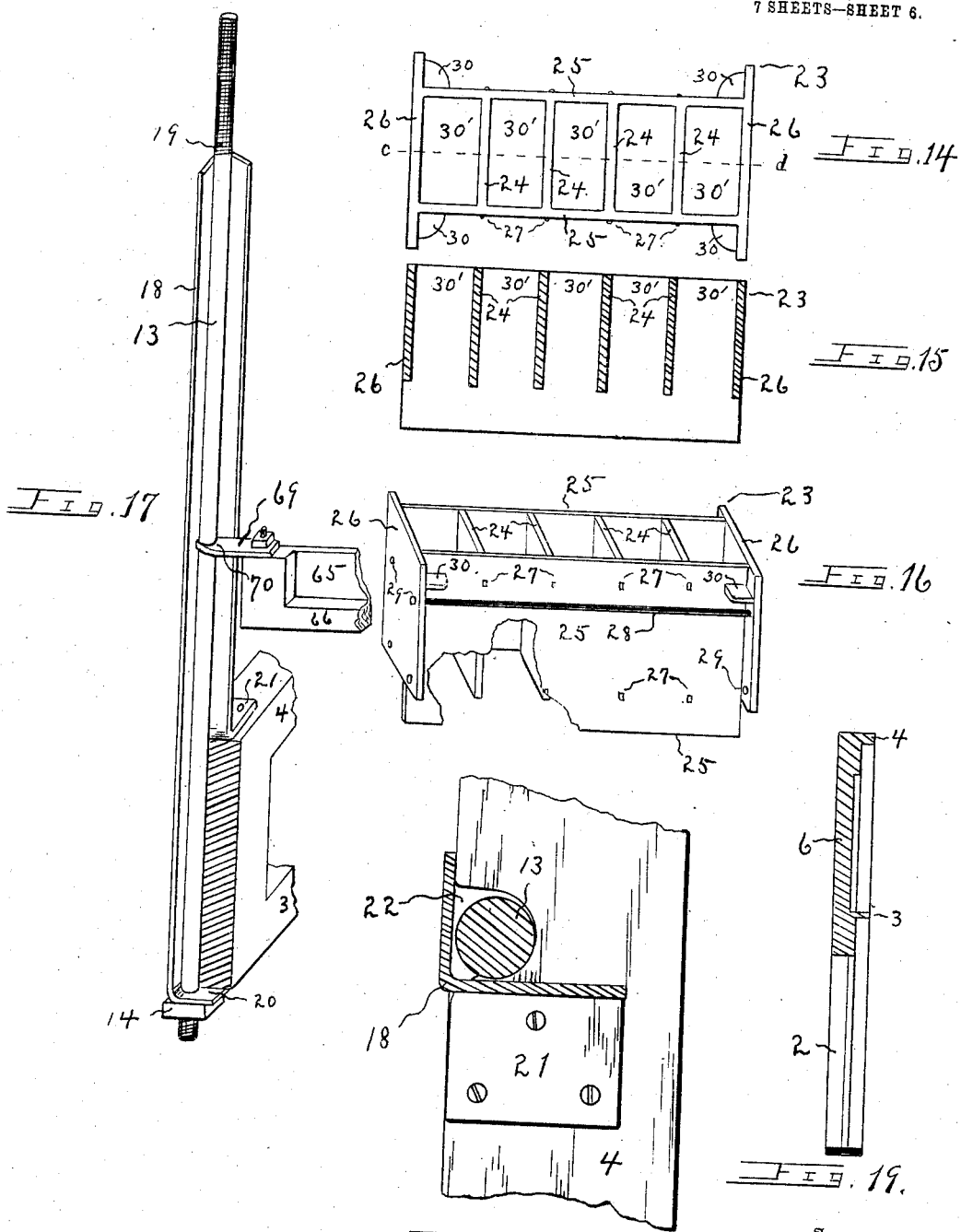
Witnesses Arthur Sturges.
Frederic Bacon
Inventor
Philip K Young
By Hiram A. Sturges,
Attorney

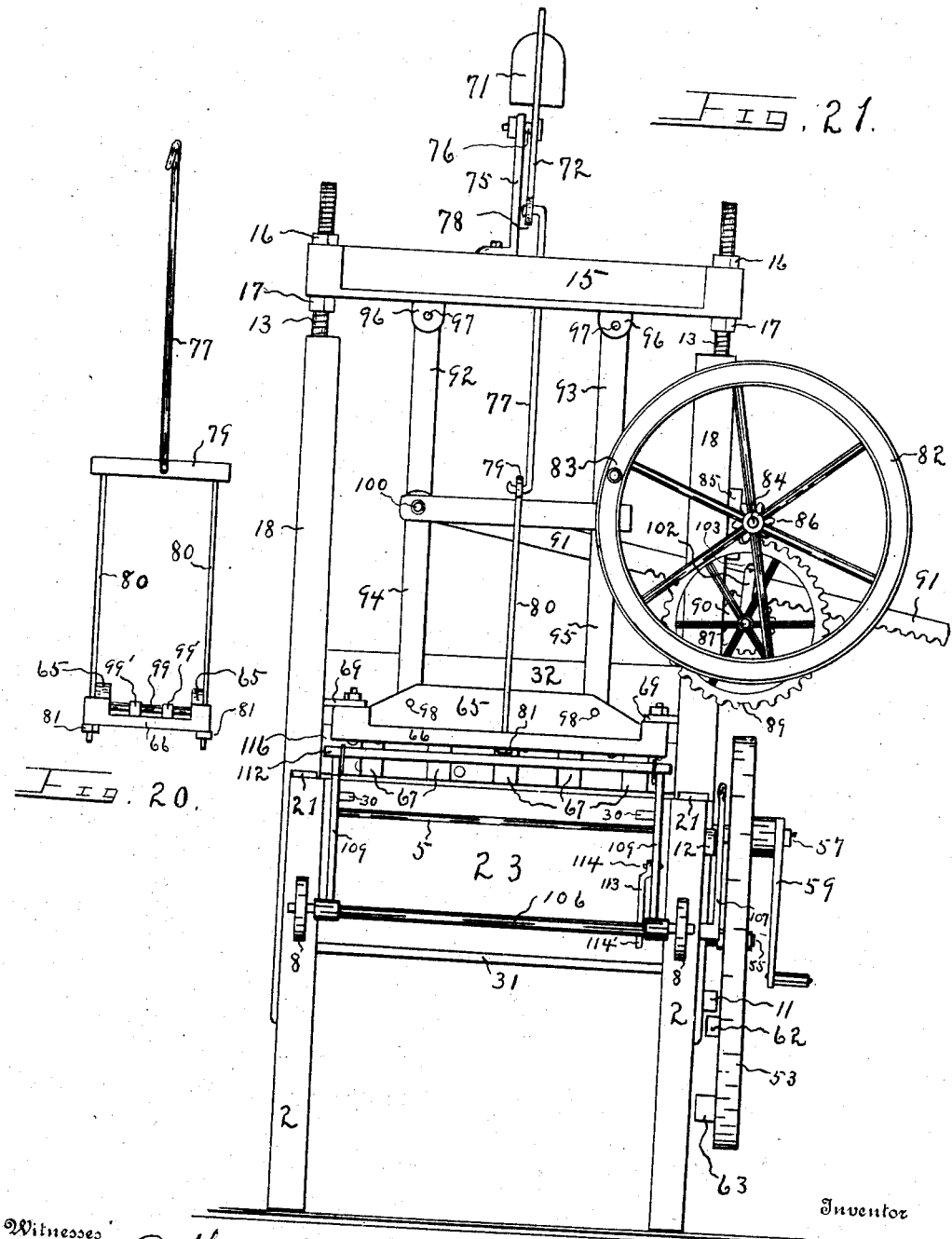

UNITED STATES PATENT OFFICE.

PHILIP K. YOUNG, OF OMAHA, NEBRASKA.

CEMENT-BRICK-PRESSING MACHINE.

No. 866,175.     Specification of Letters Patent.     Patented Sept. 17, 1907.

Application filed August 21, 1906. Serial No. 331,436.

*To all whom it may concern:*

Be it known that PHILIP K. YOUNG, a citizen of the United States, residing at Omaha, in the county of Douglas and State of Nebraska, has invented certain new and useful Improvements in Cement-Brick-Pressing Machines, of which the following is a specification.

My invention relates to improvements in cement brick pressing machines and has for its object the presentation of a means for effectively forming brick from a mixture of cement, sand and water, or other adhesive material, in an economical manner.

The novel features of the invention are fully described herein, illustrated by the drawings and pointed out by the claims.

In the drawings Figure 1 represents a vertical front view of the invention; and Figs. 2 and 3 are vertical side views thereof. Fig. 4 represents a side view, with parts broken away and parts in section, to show relative position of certain parts of the invention. Fig. 5 is a side view of the swinging pallet-frame attached to a part of the machine-frame. Fig. 6 is a perspective view of the separating-blade. Fig. 7 is a view of the inclined bottom of the hopper and of the plate-scraping blade. Fig. 8 is a plan view of the hopper, pallet-frame and part of the machine-frame. Fig. 9 is a view of the hopper and bottom plate, sectioned on line *a b* of Fig. 8. Fig. 10 is an end view showing a part of one of the vertical side walls of the hopper, the horizontal bottom plate, shield plate and engaging-plate, mounted upon a part of the machine frame, being a detail relating to Figs. 2 and 3. Fig. 11 is a detail to more clearly show certain parts of Fig. 4. Figs. 12 and 13 are perspective views, respectively, of wood and metal pallets used. Fig. 14 is a plan view of the molding box. Fig. 15 is a sectional view on line *c d* of Fig. 14 looking to the front of the molding-box. Fig. 16 is a perspective view, partly broken away, of the molding box. Fig. 17 is a perspective view showing a part of the machine-frame in section, and mounted thereon, one of the series of vertical sustaining-posts, and its angular housing-plate. Fig. 18 is a plan view showing a part of the machine-frame and recess formed therein to receive the vertical sustaining-post, parts of the figure being in section. Fig. 19 is a sectional view of the plate 6 on line *e f* of Fig. 3, looking to the rear of the machine. Fig. 20 is a detail showing links 80 and connecting parts, and Fig. 21 represents a vertical front view of the machine, to illustrate relative position of parts.

Referring to the drawings, the numeral 1 represents a machine-frame having suitable legs 2, connected by the cross-beams 3 and rails 4, and the frame may be and preferably is cast as two separate pieces, and held together firmly to a vertical position by cross-bars 5 (Figs. 2, 3.) and by other parts hereafter described.
In order to resist strain, each rail and cross-beam is united by the plate 6 (Figs. 2, 3.) provided with the aperture 7 at time of casting, and the brackets 8, 9 and 10 and stop-lugs 11 and 12 may be, and preferably are, cast integral with the frame.

For the purpose of supporting mechanism hereafter described, I construct an upright framework upon the machine frame, by use of a series of sustaining-posts 13, secured beneath cross-beams 3 by threaded nuts 14 and passing upwardly through head-piece 15, and vertically adjustable in the head-piece by means of the upper and lower nuts 16 and 17, and preferably employ the angular housing-plates 18 which extend in a manner to partly inclose the sustaining-posts from the threaded end 19 (Fig. 17.) to their lower ends; and for the purpose of firmly sustaining the plates 18 in operative position they are formed with the angular ends 20 and 21, the angularly formed end 21 terminating at and secured upon the top of rail 4 (Figs. 1, 17, 18.) and the end 20 of the housing plates passing beneath rails 3 and secured by nuts 14; the preferred construction is to provide the vertical groove 22 (Fig. 18.) formed on the outer face of plates 6 and rails 4 within which grooves the sustaining-posts pass, and this tends to prevent vibration of the parts.

I construct a molding-box 23, having partitions 24 and brackets (Figs. 14, 16.) which, with the sides 25 and ends 26 may be assembled and held in a rigid relative position by means of the pins 27, the rods 28 passing through openings 29 of ends 26, and preferably employ corner-brackets 30 cast integrally with ends 26 which make contact with sides 25 and aid in supporting the parts. The molding-box as thus constructed, has spaces 30′ between the partitions which are open at the top and bottom, the length and width of the spaces being equal to the length and width of the brick to be formed or pressed; the molding-box is placed crosswise of the machine-frame between plates 6, within the planes of sustaining-posts 13, and is securely held in position by means of cross-bars 31 and 5.

I construct a hopper 32 which is lengthwise slidable upon rails 4, so that it may pass between posts 13; and may be moved by use of the swing-bar 33, this swing-bar being constructed integral with the horizontal shaft 34, (Fig. 3) mounted in brackets 10; arms 35 are rigidly mounted on shaft 34 and links 36 are pivotally mounted at 37 upon arms 35 and at 38 upon the sides of hopper 32; and it will be readily understood that a forward or backward swing of bar 33, from manual handling, will cause a corresponding sliding movement of the hopper. The hopper has an aperture 39′ formed at the bottom and is provided with the inclined sliding-board 39 (Figs. 8, 9,); I provide the horizontal and stationary plate 40 (Figs. 8, 9, 10, 11.) which rests upon rails 4. In order that the hopper may have a true lengthwise movement upon the machine frame while sliding, I construct the angle-iron 41 (Fig. 10.) secured to the sides of the hopper, and upon the upper face of rails 4, secure guide-plates 42, the angle-irons 41 thereby being confined while sliding with the hopper to a true course along said rails 4; and I provide the shield-plates 43 secured between angle-irons 41 and the sides 44 of the hopper, these shield-plates being curved outwardly to overhang the angle-irons, and thereby prevent adhesive material from clogging or coming between the angle-irons and guide-plates.

I construct the scraping-blade 45, and the separating-blade 46 having end pivots 46' and mount these blades in the lower part of the hopper at 47 and 48 (Fig. 8.) through sides 44, and it will be understood, that when the hopper is to be filled it is first drawn backward, at which time stationary plate 40 furnishes a bottom to retain the material, said material also resting upon the inclined board 39; as the hopper is moved forward the scraping-blade 45 is pressed downward and contacts with plate 40, and it may be said that it scrapes or slides upon this plate, thereby carrying all of the material forward, and, as shown by Fig. 4 such material would be carried to the molding-box by the forward movement of the hopper, and when dies 52 are lowered, the material would drop between the partitions of the molding-box. The mechanism for forming, pressing and removal of the brick will be presently described.

I construct a series of sliding-heads 49 (Figs. 1, 4.) each having a flat outer side 50 (Fig. 4), the opposite side thereof being formed as racks 51, and formed on their upper ends as dies 52, and place one of each of said sliding-heads within a space 30' of the molding-box.

I employ the balance wheel 53 having the gear 54. Balance-wheel 53 is provided with the horizontal shaft 55 having suitable bearings on plates 6, the shaft 55 being formed throughout its length, excepting its end-bearings, as a pinion 56 (Fig. 4.), adapted to engage racks 51; and I mount the shaft 57 upon rail 4 and employ pinion 58 thereon which engages the gear 54, and, as is obvious, by manually rotating pinion 58 by means of crank 59 the series of dies 52 may be raised or lowered within spaces 30' of the molding-box.

I form slots 60 near the periphery of balance wheel 53, and, by means of bolts 61, secure the engaging-heads 62 and 63 thereon, these heads being adapted to engage, respectively, stop-lugs 11 and 12, and by adjusting heads 62 or 63 at greater or less distances apart, the dies 52 may be controlled in the distance of their travel within spaces 30' as is evident.

When the molds are to be filled with material, the dies are lowered by rotating the crank 59 and the engaging-head 62 is adjusted rigidly in slot 60 in a manner so that the dies 52 will descend a predetermined distance, according to the thickness of brick desired to be formed, and after the brick have been pressed, they are raised on dies 52 to a distance governed by the adjustment of engaging-heads 63, with lug 12; an adjustment of this head in slot 60 is made in a manner to cause the brick to be elevated a suitable distance, so that the lower edges of the brick will be on an exact level with the pallet 64 (Fig. 4.). This adjustment is made before commencing the pressing or forming of brick, and is never changed thereafter except when desiring to manufacture brick of different thicknesses or changing the pallets.

In order that the brick may be pressed with facility, I employ the slidable yoke 65 (Figs 1, 21.) and upon its base 66 form downwardly projecting struts 67. Upon the lower end of each strut I securely mount a die, as shown by the numeral 68 conforming in size to the spaces 30' of the molding-box 23. At each end of yoke 65 are secured engaging-bars 69 having curved ends 70 (Fig. 17.) one of said curved ends engaging each sustaining-post 13, and slidable thereon.

As a means of aid for dividing the weight of yoke 65 and mechanism attached thereto, I employ the weight 71 adjustably suspended upon lever 72, as by the bail 73 and notches 74. Upon the upper surface of head-piece 15 I mount the bracket 75 upon which at 76 lever 72 is pivotally mounted, and I pivotally mount the link 77 at 78 the opposite end of this link being secured at 80 the center of cross-bar 79, and at each end of cross-bar 79 is secured a link 80 (Fig. 20.), which extends downward, one link passing on each side of yoke 65 and secured at 81 upon the base 66 of yoke 65 (Figs. 1, 21.); by these means yoke 65 and mechanism thereto attached may be balanced in a manner so that the strain or vibration of the parts will be reduced, and engaging-bars 69 caused to ride smoothly upon sustaining-posts 13.

As a means for raising or lowering yoke 65 and for exerting a pressure upon material in the molding box, of dies 68, I employ the wheel 82 provided with the handle 83. Wheel 82 is mounted on shaft 84 having suitable bearings 85, and I employ the pinion 86 on said shaft. I mount on shaft 87 suitably journaled at 88, the gear wheel 89 actuated by pinion 86. On shaft 87 is mounted the gear-wheel 90 (Fig. 1, 2.), the teeth of which engage the rack-bar 91. I employ the pairs of upper links 92 and 93, and the pairs 94 and 95 of lower links. The upper pairs of links 92 and 93 are pivotally mounted upon ears 96 upon head-piece 15, preferably employing bolts 97, for that purpose; the lower ends of each pair of links 94 and 95 have pivotal mountings upon the yoke 65 at 98, preferably by means of bolts 99 passing through ears 99'; the inner ends of links 92 and 94 have toggle joint connection at 100, and the inner ends of links 93 and 95 have toggle joint connection at 101. At the junction of the inner ends of links 92 and 94 and upon the bolt of toggle joint 100 is mounted the rack-bar 91, and, as before stated, engages the teeth of pinion 90, and it will be understood, that a rotation of wheel 82 will cause the rack-bar to have a lengthwise and slight upward or downward swinging movement, thereby causing dies 68 to ascend or descend; these dies move in vertical alinement with openings 30', and by these means a powerful pressure may be easily applied, manually, for forming brick.

In order that the rack-bar may be kept in contact with the teeth of pinion 90, the yoke 102 is employed (Figs. 2, 21.), having the roller 103 thereon; as this roller engages the upper surface of rack-bar 91, the latter is prevented from disengagement with said pinion.

I construct a swinging pallet-frame 104 at the front of the machine, by use of the rotatable rods 105 and 106 best shown by Fig. 8; rod 105 has bearings between brackets 9 of the machine legs, and is provided with the operating handle 107, and with the upright arms 108 rigidly mounted thereon. Upon shaft 106 is mounted the upright arms 109, the upper end of each arm 108 and 109 being pivotally connected to link 110, and it will be understood that a swinging movement, manually applied to handle 107, will cause links 110 to move forward or backward, and in moving forward, the parts will have the relative position shown by Fig. 4. Upon the outer end of links 110 is formed the upward projection 111, which prevents a side movement in that direction of pallet 112 or pallet 64, and a drag-bar 113 is pivotally mounted at 114 on one of the arms 109, and at the time of swinging back the frame, the hook 114′ (Figs. 4, 5.) will engage rod 105, thereby limiting the swing. The pallet-frame affords a convenient means for handling brick after they have been formed.

Having explained the function of many of the parts while describing the mechanism, operation of the machine will be readily understood without any detailed statement, and it will be sufficient to say,—the parts being as shown in Figs. 1, 2 or 3, the cement or other material for forming brick, is thrown into the hopper, and slides forward upon inclined board 39 and rests upon plate 40; the end 115 of the hopper at this time being above plate 40, the material, as is apparent, is confined within the hopper. At this time the dies 52 have been lowered within the molding-box under operation of wheel 53, and control of lug 11 as explained; the pallet-frame is then thrown forward toward the machine, the pallet 64 resting preferably upon the side wall of the molding-box, as may be seen in Fig. 4; the hopper is then moved forward and the material or a part thereof will drop into the spaces 30′ of the molding-box, as far as dies 52, this distance being the predetermined thickness of the brick, as already explained; a reverse movement of the hopper, which carries separating-blade 46, is then made, causing a cutting of the material and leaving a smooth upper surface for the top of each brick; the brick are then pressed by the downward movement of dies 68, by rotating wheel 82, and after a pressure has been made, a reverse movement of wheel 82 will raise dies 68; the brick are then raised from the molding-box by rotation of wheel 53, the height to which they may be raised being governed by lug 12 and adjustment of head 63, as explained, and it is preferred that this elevation be to a height shown in Fig. 4, so that the upper surface of dies 52 will be on a level with pallet 64, and when the hopper is again brought forward to refill the mold, brick resting on the dies are caused to slide horizontally upon pallet 64 from contact with the end 115 of the hopper, and, for this purpose, I preferably use the contact-plate 116, which is secured upon the lower edge at the outer end 115 of the hopper (Figs. 1, 2, 3, 8, 9, 11.).

After the brick have been pushed upon the pallet, the pallet-frame is caused to swing upward by manually operating lever 107, the brick then being removed from the frame. I preferably employ a thin metal plate as a pallet 64.

The vertical movement of dies 68 may be regulated as to distance, by raising or lowering the head-piece 15 by manipulation of nuts 16 and 17, and posts 13 are threaded at the ends with a view of allowing a considerable degree of vertical adjustment of these dies for the purpose of manufacturing brick of any desired thickness, or of building-blocks; and the means described, together with the means for regulating the vertical adjustment of the dies, entirely control the thickness desired.

The invention as shown may be constructed at very little cost, comparatively speaking, since the parts may come from any ordinary foundry or iron-worker, and requires no particular skill for assembling; the machine may be completely operated by one person, although to better advantage, perhaps, by two.

What I claim as my invention is,—

In combination, a machine as described, comprising a frame; a horizontal shaft in suitable bearings upon the frame; a first stop-lug upon the frame; a second stop-lug upon the frame; a balance wheel secured upon said horizontal shaft and having thereon a first engaging-head and a second engaging-head; a series of stationary, vertically-disposed molds upon the frame and provided with upper, open end-portions; a series of upper dies disposed in alinement with and having means for movement within a part of the upper, open end-portions of said stationary, vertically-disposed molds; a series of lower dies; one of each of the dies of the lower series seated within each of said stationary, vertically-disposed molds and having a rack formed upon its outer edge; pinions upon said horizontal shaft in engagement with the racks upon said dies of said lower series of dies; means to produce a rotative movement of said balance wheel to cause engagement of said first engaging-head with said first stop-lug, and means to produce a reverse rotative movement of said balance wheel to cause engagement of said second engaging-head with said second stop-lug.

In testimony whereof I affix my signature in presence of two witnesses.

PHILIP K. YOUNG.

Witnesses:
HIRAM A. STURGES,
CHAS. LEONARD.